United States Patent [19]

Fieux

[11] 4,234,621

[45] Nov. 18, 1980

[54] MEANS AND METHOD OF RESTORING DOCUMENTS, PAINTINGS AND THE LIKE

[76] Inventor: Robert E. Fieux, 263 Cedar St., West Barnstable, Mass. 02668

[21] Appl. No.: 1,481

[22] Filed: Jan. 8, 1979

Related U.S. Application Data

[62] Division of Ser. No. 856,772, Dec. 2, 1977, Pat. No. 4,156,399.

[51] Int. Cl.[3] .......................... B05D 1/02; B32B 35/00

[52] U.S. Cl. .......................... 427/13; 427/140; 427/171

[58] Field of Search .......................... 427/13, 140, 171; 264/36; 361/234

[56] References Cited

U.S. PATENT DOCUMENTS

| | | | |
|---|---|---|---|
| 2,073,802 | 3/1937 | Oliver | 427/140 |
| 3,096,194 | 7/1963 | Klimann | 427/140 |
| 3,448,356 | 6/1969 | Testone | 361/234 |
| 3,916,270 | 10/1975 | Wachtler et al. | 361/234 |

FOREIGN PATENT DOCUMENTS

| | | | |
|---|---|---|---|
| 1501 | of 1858 | United Kingdom | 427/171 |

*Primary Examiner*—John H. Newsome

*Attorney, Agent, or Firm*—Wolf, Greenfield & Sacks

[57] ABSTRACT

An improved technique for the restoration of paintings, documents and the like and in particular an improved apparatus for and associated method of lining a painting or document to restore and preserve the original texture thereof. For paintings with good texture requiring only lining, a cold adhesive system is preferably used employing a substrate adhesively coated on both sides finished with a lining cloth. For paintings having a surface that is intact but with irregularities (cuping) heat is applied preferably with a hot table accompanied with the use of softening solvents and controlled lateral tension is applied to the painting using a mechanical strainer constructed in accordance with this invention to apply lateral tension in all directions to correct deformations in the surface plane of the painting. The lining of the painting may then be accomplished by a cold or hot adhesive process. For paintings in poor condition having internal imperfections such as loosened or flaking paint, the above steps may be used along with the application of an electrostatic field, rather than with the use of vacuum forces which tend to damage the surface texture of the painting, to preserve and return the painting's original surface texture.

8 Claims, 7 Drawing Figures

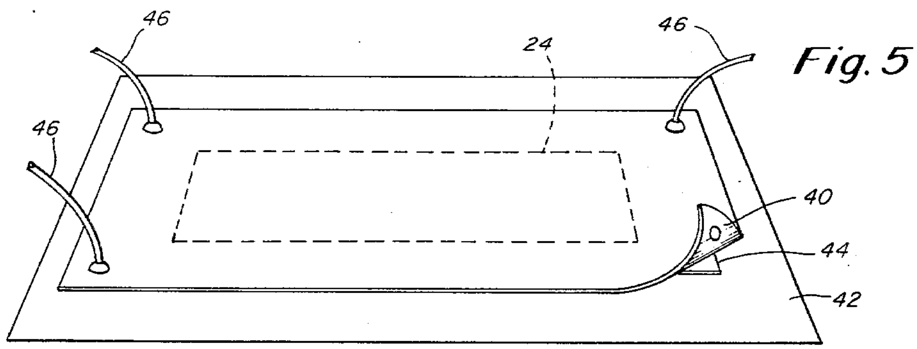
Fig. 5
Fig. 6
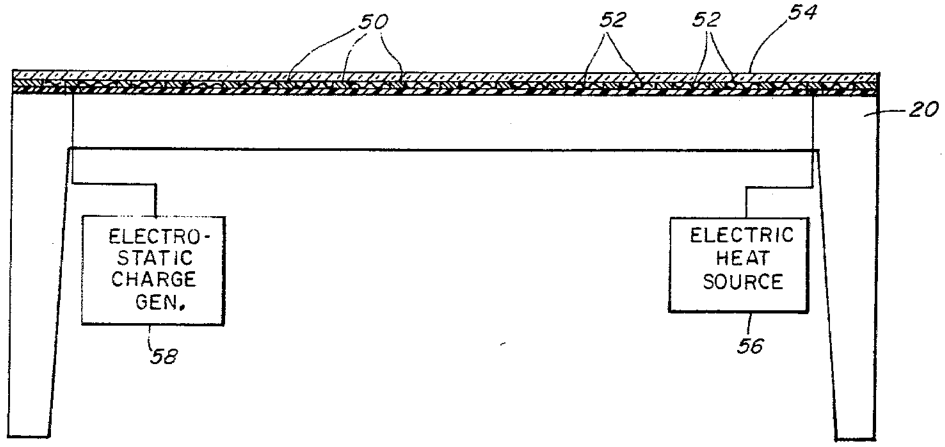
Fig. 7
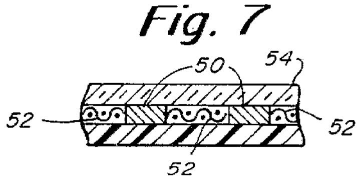

MEANS AND METHOD OF RESTORING DOCUMENTS, PAINTINGS AND THE LIKE

This is a division of application Ser. No. 856,772, filed Dec. 2, 1977 now U.S. Pat. No. 4,156,399.

BACKGROUND OF THE INVENTION

The present invention relates to an improved apparatus and method for the restoration of paintings, documents and the like. More particularly, this invention pertains to method and apparatus of restoration, preferably of paintings, to preserve the original texture of the painting. In accordance with the invention, an improved technique is disclosed for lining a painting without causing any damage to the texture of the painting.

The visual impact of a specific painting is derived from a unique combination of color, composition, size and shape, and texture. Altering any one of these properties, naturally, can considerably modify or even destroy the artist's intention. Usually the size and shape of a finished painting remain the same, as does its composition. In restoration, one of the key steps that can effect the aesthetic characteristic of the painting is the method of lining that is used to provide support for the work of art. Improper techniques can cause physical damage to the paint film as well as a change in the textural quality of the painting.

Most paintings that are now being restored are paintings that were formed on canvas. Canvas is not a rigid or solid material. Rather, it consists of fine filaments of fiber twisted into strands which then are woven into a somewhat loose mesh. The strands are not uniform in dimension, being thicker or thinner along their length, and having small gathers of fiber at intervals called slubs. When woven, several strands of the warp or weft may be of different diameter than adjacent ones, and along them are occasional lumpy slubs.

The entire paint film may consist of one or more layers: a thin glue sizing, a coat of primer and the paint applied by the artist. None of this penetrates the canvas, but rests mainly upon the surface of the fibers. In other words, a painting on canvas is a pigment layer or a composite paint film that is weakly bonded to the canvas underneath. Although a canvas is a durable material it is susceptible to deterioration over time and also to damage from physical accidents.

To protect paintings for about the past 300 years, linings have been bonded to the canvas using various adhesive systems. Originally, linings were attached using an animal or vegetable-base aqueous glue. This required the use of weights, presses or similar devices to maintain the necessary contact while the glue set. Although this glued lining helped to delay structural damage of the canvas, it often had negative effects on the paint layers. That is, when the work of art had been painted on a canvas prepared with an aqueous glue sizing, the moisture released during the lining process reacted with the sizing and caused the sizing (and with it, the painting) to detach and flake off. In addition, the mechanical pressure necessary to insure adhesion marred the surface texture—impastos were pressed into the paintings, and delicate passages flattened.

Toward the end of the 19th century, the aqueous glue was replaced by a mixture of wax with gum tactifiers. This mixture, being thermoplastic, needed heat for the application and joining of lining and painting. The destructive effect of moisture was eliminated, but ironing, the required method with wax, presented its own problems. That is, how could a flat and even contact be maintained as work progressed over the surface of the painting while the wax was cooling and setting.

This problem was overcome by the development of a hot table—a table with a heated top which permitted weighted boards to hold the work flat until it was completely cold. Soon thereafter, in the 1950's a vacuum pressure was used as the means of force against the painting surface. This vacuum pressure was used in the form of a vacuum hot table. This method of covering the painting with a large plastic membrane and pumping out the air beneath was originally conceived as a procedure that would produce a soft and innocuous pressure to keep the painting and new lining flat and in uniform contact throughout the lining process. However, there were indications that paintings lined in this manner displayed disfiguring textural impressions from the subsurface irregularities in the lining fabric. This prior art technique typically employed treatment in a single operation on a hot table combining heat in the range of 150° F.–165° F. along with vacuum pressures ranging from 5"–20" of mercury.

There has been a clear indication through tests and other investigations that alterations to the artistic texture can reach maximum proportions under vacuum pressures even as low as 5" of mercury in some instances. While all paintings are not equally sensitive to lining pressures, either vacuum or mechanical, there is no other way than by empirical means to determine whether or not textural damages will occur during lining. Furthermore, considering the potential danger that vacuum poses to delicate and susceptible paintings, the general design of the vacuum hot table is not adequate for such delicate operations. For one thing, the commercially available vacuum hot tables are equipped with vacuum pumps far in excess of the requirements. Therefore, an excessively high vacuum could be attained in a fraction of a second if the operation is not conducted carefully. These tables are provided with vacuum outlet holes in the corners; the vacuum being achieved by covering the lining work with an air-tight membrane. The removal of air may be made more even with the use of porous tapes or strips. However, it has been found that the vacuum levels are indeed non-uniform over the painting surface especially with large paintings. Also, the pressure is usually measured at the pump which is indeed inaccurate as it is the pressure at the surface of the painting that should be measured.

The manner in which vacuum membranes are employed to seal out air and achieve pressure gives rise to further problems which come about as temperatures increase luring the heating cycle of the lining process. As the membrane warms it becomes more flexible and clings more closely to the table top providing a more effective air seal. Vacuum pressure balance previously set can then begin to rise, often without the knowledge of the operator because such pressure increases do not always show immediately on the system gage. The dangers inherent in this are obvious, and the vacuum hot table systems frequently lack arrangements to prevent unwanted pressure increases.

All of these factors, excessively powerful pumps, inefficient air flow, unequal vacuum pressures, absence of positive pressure control devices, and leaky air seals around the membrane edges which can open and close as heat and vacuum vary and cause fluctuations in vacuum pressure do not register on the system gage located near the pump—add up to a great inability to adequately control operating conditions. Therefore, there are definite textural changes that take place in the texture of the painting with the use of the present vacuum hot table systems.

Accordingly, it is an object of the present invention to provide an improved means and method for the restoration of paintings, documents and the like.

Another object of the present invention is to provide an improved cold adhesion system for the lining of paintings, preferably for use with paintings requiring only the attachment of a lining.

Still another object of the present invention is to provide an improved means and method for the restoration of paintings and in particular for the restoration of the lining of the paintings without causing any damage to the painting and without altering the original texture of the painting.

A further object of the present invention is to provide an improved means and method of restoring paintings to their original planar composition without the requirement for significant forces applied perpendicular to the surface of the painting.

Still another object of the present invention is to provide an improved apparatus useful in the restoration of paintings and which employs an electrostatic hold technique rather than the more troublesome prior technique of vacuum pressure.

SUMMARY OF THE INVENTION

To accomplish the foregoing and other objects of this invention, there is provided an improved apparatus and improved method for the restoration of paintings, documents and the like. For the placement of the lining on a painting which is otherwise in excellent condition, a cold adhesive system may be used in accordance with the present invention. This system comprises a flexible substrate layer, may comprise a fine mesh fabric material, adhesive means on both of the substrate layer, and a lining cloth. One side of the substrate main support layer is for attachment to the rear surface of the painting, document or the like while the lining cloth is secured to the other side of the substrate layer. The combination of the substrate with the adhesive may be provided along with a backing in a roll which could easily be unrolled in sections for use with the lining cloth. The adhesive preferably is a silicone pressure sensitive adhesive while the lining cloth is preferably a cotton polyester poplin. The main support, or substrate, can be fiberglass, strong woven polyester, or such similar fabrics.

For works of art requiring more extensive restoration, such as a painting that has surface irregularities, a mechanical strainer is used in accordance with the invention. This mechanical strainer applies lateral tension to the painting without the necessity for any perpendicular pressure to the surface of the painting. For some applications, electrostatic hold may be used in conjunction with the lateral tension, but for some cases only lateral tension need be used. The mechanical strainer in accordance with the invention comprises a multi-sided frame covering an area larger than the surface of the painting, a plurality of elongated members, each disposed adjacent a side of the frame and each having means for coupling to an edge of the painting, and tension adjusting members. At least two of these tension adjusting members are spacedly disposed along each elongated member and coupled between the member and the adjacent frame size. Preferably, yieldable securing strips are coupled respectively between an elongated member and an edge of the painting. The painting is caused to stretch by movement of the adjusting members very gradually under strict observation by the skilled restorer. For a square or rectangular painting, there may be provided a total of eight adjusting members disposed along each side of the frame. For this arrangement, the adjusting members are gradually tightened, first on one side and then on the other so that the painting or other work of art is gradually stretched.

In accordance with the method of the present invention it is preferred that a work of art be subjected to a heating step preferably accompanied by the application of vapors of a softening fluid to the work of art which operates with the application of heat to make the work more supple. At essentially the same time, the mechanical strainer, which functions as a holder for the work, applies tension in the plane of the work of art to slowly correct surface irregularities. Sometimes the work progresses very slowly depending upon the condition of the painting. Depending upon the type of adhesive with which the painting will be impregnated, the heat is applied either at a lower temperature of a higher temperature. If the lining is to be attached by a cold adhesive system the temperature may be maintained on the order of 100° F. during the softening and stretching phase of restoration. On the other hand if internal consolidation by a heat activated adhesive is to be used in accordance with the invention, elevated temperatures above 100° F. and preferably in the range of 150° F.–165° F. are used to activate the adhesive so that it can permeate the work. A similar heating phase is also used when the lining is attached by this heat activated adhesive.

Some paintings are in extremely poor condition having surface cracks and a flaking of the paint in addition to possible surface irregularities. For paintings that are restored of this type, usually a heat activated adhesive is used in conjunction with the application of lateral tension with the mechanical strainer of the present invention. In addition, in accordance with the method of this invention, an electrostatic field is applied to the work to attract the work toward a working surface. This working surface is the top of a table used in the restoration of works of art. This table comprises means defining a top having a working surface upon which the work may rest, means associated with the top for providing controlled heating of the working surface, and means associated with the top for establishing an electrostatic charge field below the working surface as a means for attracting the work of art toward the working surface. In a painting having cracks and pieces of paint that are flaking from the canvas, the electrostatic field attracts the flaking pieces or any lifted sections of the paint surface. The electrostatic technique along with the application of heat and lateral tension has been found to be extremely successful in restoring the surface of the painting to its original texture without causing any further damage to the painting as has been previously experienced with the use of vacuum pressures. A static attracted membrane may be used to enhance flake implacement and flattening.

The electrostatic field may be established in accordance with the present invention in two embodiments disclosed herein although it is understood that various other arrangements may be provided for establishing the electrostatic field for attracting the work of art to a rigid working surface. In one arrangement the means includes sheet means above the working surface over the work of art and means for passing air under force between the sheet means for establishing the field. However, in the preferred embodiment, there is provided an electrostatic generator means disposed primarily under the working surface for establishing this field. In the preferred construction the table is provided with heat generating coils or strips disposed just under the surface of the table for maintaining the working surface at a controllable temperature. Also, either in a separate layer or interweaved with the heating strips is provided an electrostatic generating means such as electrical mesh means used in association with an electrophorous material such as a glass sheet disposed and functioning as the working surface of the table.

DESCRIPTION OF THE DRAWINGS

Numerous other objects, features and advantages of the invention should now become apparent upon a reading of the following detailed description taken in conjunction with the accompanying drawings, in which:

FIG. 5 is a diagram of one arrangement for establishing an electrostatic holding field over the work of art; and FIG. 6 is a schematic diagram of a preferred work table incorporating heating and the establishment of an electrostatic field.

FIG. 7 is an enlarged fragmentary cross-sectional view taken through the table of FIG. 6.

DETAILED DESCRIPTION

The present invention teaches a technique that may be formed in a number of steps depending upon the condition of the painting that is to be restored. For example, for a painting that is in extremely poor condition, probably all of the techniques of the present invention will be employed in restoring this painting. On the other hand, for example, for a painting which is only to be lined, only a cold adhesive process need be used.

Figure 1:
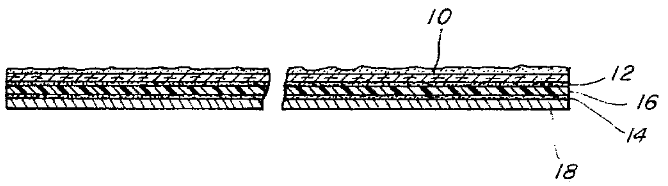
FIG. 1 is a fragmentary cross-sectional view showing the cold adhesion system of the present invention as applied to a painting.

For a painting that is in good condition with little or no former alteration of the texture of the painting, but which requires the application or replacement of the lining of the painting, a cold adhesive system in accordance with the present invention may be employed. FIG. 1 is a cross-sectional view showing the lining applied to the painting 10. The painting 10, of course, comprises a paint film on canvas. The adhesive itself that is used with this system may be of the type sold by Dennison Company identified as their "Densil". One type that can be used is the Densil No. 2078 silicone pressure sensitive transfer adhesive. FIG. 1 shows these adhesive layers 12 and 14 which are sold commercially affixed to a backing paper not shown in FIG. 1. This adhesive is coated on both sides of the substrate 16. A coated substrate 16 may be supplied in a roll having a backing on one side thereof which backing is not shown in FIG. 1.

The substrate material 16 may be a filter or like fabric material such as Pecap EP110-SK20 sold by Tetko, Inc. This material may be a woven polyester monofilament, fiberglass, or a polyester mylar. The lining cloth 18 shown in FIG. 1 is preferably constructed of a material that has an appearance similar to that of of canvas. A suitable lining cloth may be a cotton polyester poplin. This material is relatively texture-free and has an appearance similar to canvas. In an alternate arrangement the substrate 16 may also be constructed of a transparent material without the use of any lining cloth or with the use of a transparent liner so that the original rear surface of the canvas painting can be seen. This is usually used where there is some marking or writing on the rear canvas of the original painting.

In the restoration of paintings it is necessary to sometimes restore a painting that has surface irregularities but that is otherwise free of cracks and flaking. As indicated previously in the past paintings of this type were restored by applying relatively substantial perpendicular pressure either by weights or by vacuum force to the surface of the painting. In accordance with the present invention, however, a lateral tension is employed along with the application of heat and the additional use of softening solvent vapors. In this connection, reference is now made to the perspective view of FIG. 2 which shows a hot table 20 having disposed thereon a mechanical strainer 22 constructed in accordance with the invention and for holding the painting 24.

Figure 2:
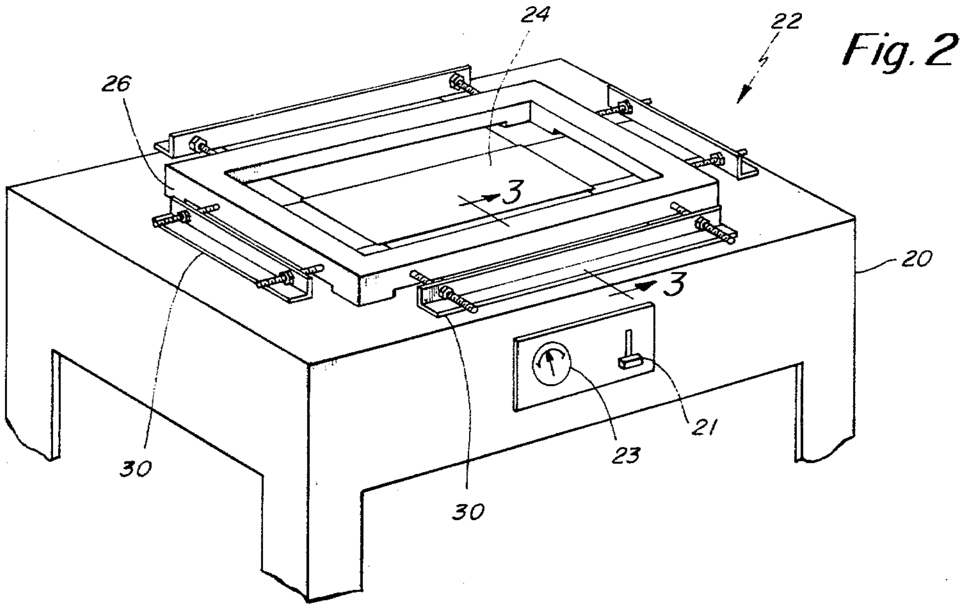
FIG. 2 is a perspective view showing the painting or other work of art supported by the mechanical strainer of this invention on top of a hot table.

For the process wherein the paint surface is intact but has surface irregularities, the hot table 20 may be of the conventional type employing heating coils in the top surface thereof. FIG. 2 shows a control switch 21 associated with the table and a settable temperature control 23. Alternatively, the table 20 may be of the type described hereinafter with regard to a further concept of this invention.

Figure 3:
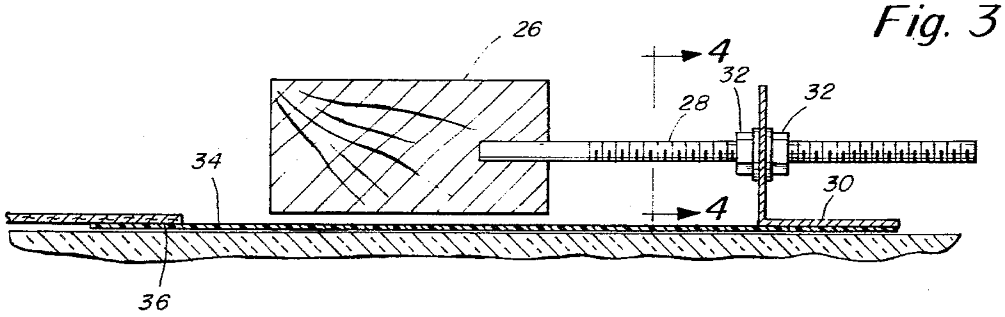
FIG. 3 is a cross-sectional view taken along line 3—3 of FIG. 2 showing further details of the mechanical strainer.
Figure 4:
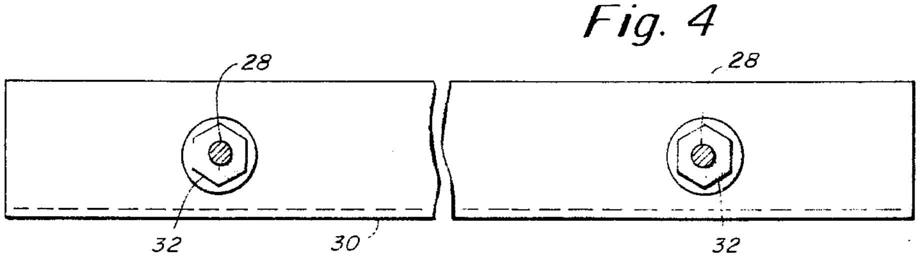
FIG. 4 is an end view on one side of the mechanical strainer.

FIGS. 2–4 show the construction of the mechanical strainer 22 which comprises a square or rectangular frame 26 which may be constructed of wood or preferably a light metal such as aluminum. The frame 26 is maintained in a fixed position relative to the painting and each side of the frame has extending therefrom two or more studs 28, each of which is fixedly secured in the frame section. An elongated bracket 30 having an L-shaped cross-section is disposed adjacent to the frame, spaced from the frame and extending longitudinally of each frame section. In either the square or rectangular arrangement of the frame there are four brackets 30, one disposed adjacent each side of the frame. Each elongated bracket 30 has holes disposed therealong with the number of holes corresponding to at least the number of studs 28. The studs 28 pass through the holes in one leg of the bracket 30 and are secured in position by a pair of adjustable lock nuts 32. The stud 28 is preferably threaded along its entire exposed length that extends from each frame section. In this way the brackets 30 can each be individually adjusted relative to their adjacent frame section.

Four securing strips 34 are used between the tack edge 36 of the painting and the lower surface of the bracket 30 as clearly depicted in FIG. 3. The securing strips 34 may typically each comprise a plastic film or a polyester fabric and each of the strips is secured by a suitable adhesive at its edges to the painting and bracket 30, respectively.

Once the securing strips have been secured to the painting and also to the bracket 30, the bracket 30 may very slowly be moved by rotation of the nuts 32 thereby commencing a stretching of the strips 34 and the painting.

In using the mechanical strainer 22 shown in FIGS. 2-4, the painting is first secured in the strainer in the manner previously discussed. The painting is maintained on the hot table 20 so as to warm the surface of the painting to a temperature of say 100° F. The painting may be warmed to higher temperatures but is is preferred to not warm the painting to any higher temperature than is necessary because the presence of ambient moisture may affect the sizings in the original painting or excessively soften the paint, which may cause problems. As the heat is applied, softening solvents may also be lightly applied to the rear of the painting. Generally, about 50 cubic centimeters of solvent solution are sprayed per square meter of painting. The painting may also be covered to maintain the solvent vapors in the painting. After the painting has been sufficiently warmed and the solvents have acted to soften the canvas structure of the painting, then lateral tension may be applied by the mechanical strainer under visual observation to slowly restore the irregularities in the surface of the painting so that the painting can then resume its original planar configuration. This process of heat, solvents and lateral tension may be repeated as many times as is necessary to correct the irregularities in the surface of the painting. Thereafter, a lining may be attached using the cold adhesive process previously discussed with reference to FIG. 1. Alternatively, the lining may be attached in another manner discussed hereinafter.

The solvents that are used in softening the painting may simply be a light spray of water that is preferably at least partially heated. Other solvents that may be used include alcohol or other paint softening solvents preferably sprayed in a light mist on the back of the painting. These solvents vaporize to make the painting more supple.

One of the most difficult types of restoration is when the surface has, in addition to surface irregularities, other imperfections such as surface cracking or actual separation of the paint from the canvas or primer. To restore paintings having such defects in accordance with the present invention, it is preferred to use a combination of applied heat, a heat activated adhesive along with the improved method of this invention of using electrostatic hold rather than the previously used method of applying vacuum. As previously indicated vacuum is very difficult to control and represents a fluid type of force that also causes pressure by molecular or atomic bombardment on the surface of the painting. On the other hand, the electrostatic hold process of this invention provides a means of attracting the painting to the lining without any danger of excessive pressures being applied to the painting surface.

The process of restoration of paintings of this last type may include many of the steps previously discussed. When a painting has cracks in its surface in addition to surface irregularities, extreme care must be taken in handling the painting and any work on the painting is usually only performed by a skilled artisan. One of the very first steps in handling a painting with cracks is to apply a facing to the painting which may be an adhesive bound tissue paper to keep all paint flakes from falling off the surface of the canvas. Once the facing has been applied and the painting has been removed from its original frame, then many of the steps discussed previously may be used. For example, softening solvents are applied to the rear surface of the painting accompanied by the application of relatively low temperature heat. Again, this process is practiced using a hot table. However, in accordance with the invention the hot table that is used is of new and improved construction preferably combining within the surface of the table heating means and means for generating an electrostatic field above the table top.

Along with the use of the solvents and heat, the painting is also maintained in the mechanical strainer 22 discussed previously with reference to FIGS. 2-4. The combination of solvents, heat and lateral tension may be used to correct the surface irregularities in the painting to return the painting to the original planar state.

After the application of heat and lateral tension, the canvas rear surface of the painting may be impregnated with an adhesive such as the now used adhesive Beva 371 sold by Adams Chemical Company of Spring Valley, N.Y. This adhesive may be ethyl vinyl acetate or another adhesive that may be used is a wax resin. This adhesive is rolled onto or brushed onto the back of the painting and is of the type that is activated with heat in the range of 150° F.-165° F. The painting, still being maintained in the mechanical strainer 22, is maintained on the hot table so that the adhesive can be activated and at the same time an electrostatic field is applied to the painting to attract any dislodged pieces of paint back to the original position on the canvas. At this stage of the process no lining has yet been applied to the rear of the painting.

The electrostatic hold technique of the present invention eliminates vacuum as a pressure source. In one embodiment illustrated in the schematic diagram of FIG. 5 a vacuum system is employed to move air between two polyester membranes thereby establishing an electrostatic field. The electrostatic hold procedure takes advantage of the electrostatic properties of, for example, a polyester film to insure that a smooth, flat surface is maintained over the painting during the process of impregnating the painting with an adhesive and thereafter during the process of lining the painting. The procedure of this present invention eliminates the vacuum environment relying instead upon the creation and maintenance of an electrostatic charge; the charge differential between the polyester film and the metal top of the hot table is sufficient to attract the polyester film down firmly toward the metal, thereby keeping the lining and painting in uniform contact.

In FIG. 5 there is shown in dotted an outline of the painting 24 or the painting and the lining. Two thin, one half mil, sheets of polyester film 40 and 42 are placed together with a sheet of fiberglass 44 between the sheets 40 and 42. The sheet 42 is placed directly over the painting and the painting in turn is disposed on the top of the hot table not shown in FIG. 5. The sheet of fiberglass 44 is smaller than the sheet 42. The second sheet 40 is larger than the fiberglass sheet but smaller than the counterpart sheet 42.

The upper polyester membrane 40 is punctured in the corners just above the fiberglass and vacuum lines 46, only three of which are shown in FIG. 5, are attached and held in place over the holes in membrane 40.

A vacuum pump not shown in the drawings couples to the lines 46 and passes a flow of air between the two polyester membranes and through the fiberglass sheet 44. Because the three materials—polyester film, fiberglass, and metal table top—all possess electrostatic qualities, the resultant static charge, created and maintained by the friction of air being drawn between the polyester membranes by the vacuum pump, causes the whole covering package to press downward against the table top. A flat surface is thereby kept over the entire painting surface.

With the arrangement shown in FIG. 5 vacuum does not exist under the lower membrane as long as this membrane is kept intact. The slight vacuum that does exist is entirely within the space between membranes 40 and 42. All of the sheets may be lifted off the lining if adjustments are required in the lining of the painting, or if surface attention is required to the painting while the lining is taking place.

The pressure developed using the electrostatic hold process has been estimated from the imprint tests on a soft formable film, such as one half mil polyester or six mil poly vinyl chloride at lining temperatures of 150° F. The imprint upon the film over canvas in the electrostatic hold process is significantly less than that resulting from a vacuum imprint. Thus, the electrostatic hold technique gives the conditions originally sought through the vacuum process; that is soft uniform pressure which is incapable of damaging works of art.

In the embodiment of FIG. 5 the lower membrane 42 is intact and larger than the upper membrane 40. Whatever vacuum exists will be contained entirely between the two membranes and has no effect or relation to pressure upon the painting. Furthermore, the vacuum pressure is maintained at a low level but one sufficient to generate the electrostatic charge. As warming of the hot table progresses, the membranes become more pliable as does the painting and the flat downward effect becomes more pronounced. Occasional brushing with a wide brush or smoothing by hand prevents wrinkling during the heating and cooling stages from expansion and contraction.

In the process discussed to this point, the canvas of the painting has been impregnated with an adhesive. Thereafter, a cold adhesive system may be used for applying the lining. However, it is preferred that a heat activated adhesive be used especially for paintings in need of major repair. When the painting is to be lined after it has been heated and stretched as previously explained, an adhesive such as the Beva 371 may be applied to the rear surface along with a lining material such as the previously mentioned Pecap material or even a further canvas layer or other synthetic material. With the lining so secured the painting is again subjected to heat and the electrostatic hold as illustrated in FIG. 5.

Although the structure shown in FIG. 5 is quite adequate for establishing the necessary electrostatic hold, reference is now made to a preferred version of FIG. 6. FIG. 6 is a schematic diagram showing the hot table 20 and further schematically representing means 50 which may be a fine mesh for establishing an electrostatic charge. Also schematically shown in FIG. 6 are a series of electrical heating conductors 52 which are disposed below the top surface 54 of the hot table. These heat conductors are shown schematically coupling to an electrical heat source 56. Similarly, the electrostatic means 50 is shown coupling to an electrostatic charge generator 58. Both the electrical heating source 56 and the electrostatic charge generator are of conventional design. An existing commercial table that has an electrostatic attracting field established therein is one sold by the Simco Company of Landsdale, Pa. identified as their Electro-Plaque table. The commercially available tables, however, are not provided with the heating feature and in fact there is in the prior art, no indication of a combination of heat and electrostatics in a single table structure.

The arrangement shown in FIG. 6 is somewhat more advantageous to use than the arrangement shown in FIG. 5 in that the top surface of the table is then completely free without the requirement for a number of sheets to be used in association with the table. However, it is preferred that at least one polyester film be draped over the painting on this electrostatic heat table so as to enhance the electrostatic charge. Furthermore, the sheet that is draped over the painting also applies some slight additional pressure to the painting.

Having described a limited number of embodiments of the present invention, it should now become apparent to those skilled in the art that numerous other embodiments are contemplated as falling within the scope of this invention. For example, there has been set out herein, a number of different steps that may be used in restoring paintings depending upon the condition of the painting. It is not intended that all of these steps necessarily be performed in restoring any one painting as the restoration of a painting depends to a great extent upon a close analysis of the work that will have to be performed in accomplishing this restoration. Although the lateral tension feature of the invention is an important feature of the invention there may be applications wherein the tension is not employed but the electrostatic hold process is employed. Alternatively, in some applications only lateral tensioning may be needed without the requirement of electrostatic hold.

What is claimed is:

1. A method of restoring paintings, documents and the like comprising the steps of;
   - providing a strainer means,
   - securing the painting in the strainer means,
   - heating the painting so as to make the painting more supple,
   - and applying lateral tension by operation of the strainer means in the plane of the painting to correct surface irregularities.

2. A method as set forth in claim 1 wherein the heat is applied at a temperature up to one on the order of 100° F.

3. A method as set forth in claim 2 including applying a softening fluid to the painting operating with the heat to make the painting supple.

4. A method as set forth in claim 1 including applying a heat active adhesive to the rear surface of the painting and applying heat at a temperature over 100° F. to activate the adhesive so that it can permeate the painting.

5. A method as set forth in claim 4 including applying an electrostatic field to the work to attract the work toward a working surface to correct for planar deformations.

6. A method of restoring a painting, document or the like comprising the steps of;
   - providing a strainer means,
   - securing the painting in the strainer means,
   - applying a heat activated adhesive to the rear surface of the painting,
   - applying heat to the painting at a temperature sufficient to activate the adhesive,
   - applying lateral tension by operation of the strainer means in the plane of the painting to correct surface irregularities, and applying an electrostatic field to the painting to attract the painting toward a working surface.

7. A method as set forth in claim 6 including draping an electrophorous sheet over the painting to enhance the field.

8. A method as set forth in claim 1 including the step of applying a heat activated adhesive to the rear surface of the painting prior to the heating step.

* * * * *